United States Patent [19]

Ryder, Sr. et al.

[11] Patent Number: 4,953,209

[45] Date of Patent: Aug. 28, 1990

[54] SELF-VERIFYING RECEIPT AND ACCEPTANCE SYSTEM FOR ELECTRONICALLY DELIVERED DATA OBJECTS

[75] Inventors: John H. Ryder, Sr., Durham, N.C.; Susanna R. Smith, Tampa, Fla.

[73] Assignee: International Business Machines Corp., Armonk, N.Y.

[21] Appl. No.: 264,653

[22] Filed: Oct. 31, 1988

[51] Int. Cl.$^5$ ............................................. H04L 9/00
[52] U.S. Cl. ...................................... 380/23; 380/25; 380/3
[58] Field of Search .............................. 380/23, 25, 3

[56] References Cited

U.S. PATENT DOCUMENTS 4,658,093 4/1987 Hellman ............................. 380/25
4,683,553 7/1987 Mollier ............................. 380/25

OTHER PUBLICATIONS

Cryptography—A Primer, Konheim, 1983, pp. 65–66.

*Primary Examiner*—Thomas H. Tarcza
*Assistant Examiner*—David Cain
*Attorney, Agent, or Firm*—Edward H. Duffield

[57] ABSTRACT

A system for electronically transmitting data objects such as computer programs with a means for verifying that the computer program was actually received and the terms and conditions of its use accepted by the receiver is presented. In this system, the computer program itself controls the verification for its receipt and acceptance. The sender first modifies the program to be delivered, rendering it non-executable in the form in which it will be received by the user initially. The sender inserts into the program an enabling routine and a verification indicia. The enabling routine is capable of rendering the non-executable program into an executable state if certain prerequisite conditions, contained in the verification and enabling routine, are met. The recipient or receiver inserts or loads the modified, non-executable program into the workstation or computer having a CRT screen display, a printer or the like that allows human observation of certain information that will be presented by the enabling program. The enabling program then displays messages or prompts to the user for entering the user's responses such as acceptance of the terms and conditions of the use of the program. In response to desired indications of acceptance by the user, the enabling program decides whether the prerequisite conditions for enabling the program into an executable form have been met and if they have been met, remodifies the program into a usable, executable form. If the prerequisite conditions are not met or agreed to, the verification and enabling program terminates without rendering the actual program itself into an executable form.

10 Claims, 9 Drawing Sheets

| INTERFACE/FUNCTION | NOTES |
|---|---|
| PROVIDE TEXT FOR THE LICENSE AGREEMENT SCREEN(S). ON THE LAST SCREEN OF THE LICENSE AGREEMENT, THE USER MUST INDICATE ACCEPTANCE OR REJECTION OF THE TERMS AND CONDITIONS BEFORE THE OBJECT OR SOFTWARE PRODUCT WILL BE INSTALLED. | |
| INSERT A PREDEFINED CHARACTER STRING INTO THE PRODUCT'S MAJOR MODULE(S)/FILE(S). THIS CHARACTER STRING MAY BE MODIFIED AND/OR ENCRYPTED AFTER THE LICENSE AGREEMENT HAS BEEN ACCEPTED BY THE USER. MODIFICATION OF THE CHARACTER STRING INDICATES THAT THE USER HAS ACCEPTED THE TERMS AND CONDITIONS OF THE LICENSE AGREEMENT. | THERE MUST BE AT LEAST ONE FILE WHICH CONTAINS THE CHARACTER STRING. |
| CREATE THE COPY OF THE PRODUCT OR OBJECT WITH THE FILENAMES "SCRAMBLED AND GIVEN PSEUDO NAMES. ALSO, PROVIDE A TABLE WHICH CROSS REFERENCES THE PSEUDO (SCRAMBLED) FILENAMES WITH THE REAL FILENAMES. | THE FILENAMES WILL NOT BE RESTORED (i.e., THE SOFTWARE PRODUCT WILL NOT BE USEABLE) UNTIL THE LICENSE AGREEMENT HAS BEEN ACCEPTED BY THE USER |

| | |
|---|---|
| INSERT A TEST ROUTINE INTO THE CODE OF EACH OF THE SOFTWARE PRODUCT MODULES/FILES CONTAINING THE CHARACTER STRING TO ALLOW EXECUTION OF THE MODULE(S) AFTER INSTALLATION ONLY IF THE STRING HAS BEEN MODIFIED (i.e., THE LICENSE AGREEMENT HAS BEEN ACCEPTED BY THE USER). | THE IMPLEMENTATION OF THIS OPTIONAL FEATURE BY THE SOFTWARE PUBLISHER PROVIDES ANOTHER LEVEL OF ASSET PROTECTION. |
| PROVIDE THE LOCATION IN THE SOFTWARE PRODUCT MODULE/FILE FOR THE CHECKSUM WHICH WILL BE RECALCULATED UPON ACCEPTANCE OF THE LICENSE AGREEMENT AND COMPLETION OF THE PROCESSING PROGRAM. | THE IMPLEMENTATION OF THIS OPTIONAL FEATURE BY THE SOFTWARE PUBLISHER PROVIDES ANOTHER LEVEL OF ASSET PROTECTION. |
| PROVIDE A BATCH FILE PROGRAM OR INSTALLATION PROGRAM TO WHICH CONTROL WILL BE TRANSFERRED AT THE COMPLETION OF THE ACCEPTANCE VERIFICATION ENABLING PROGRAM AFTER THE USER HAS INDICATED ACCEPTANCE OF THE LICENSE AGREEMENT. | THIS LINK PROVIDES THE TRANSFER BETWEEN THE RECEIPT AND ACCEPTANCE ENABLING PROCESSING PROGRAM AND THE SOFTWARE PRODUCT. |

| |
|---|
| PRESENT THE APPLICABLE TERMS AND CONDITIONS TO THE USER BY DISPLAYING THE FOLLOWING: |
|    RECEIPT AND ACCEPTANCE MENU SCREENS (MAY INCLUDE MENU, WARRANTY AND LICENSE AGREEMENT SCREENS) |
| IF THE USER DOES NOT ACCEPT THE TERMS AND CONDITIONS DISPLAYED BY RECEIPT AND ACCEPTANCE SCREENS, ABORT AND RETURN TO THE ORIGINAL OBJECT MODULES/ FILES, DO NOT ACTIVATE INSTALLATION OF THE OBJECT.<br>ELSE<br>   CONTINUE. |
| 1. SEARCH FOR THE CHARACTER STRING, AND MODIFY (AND ENCRYPT) THE STRING INSERTED BY THE OBJECT ORIGINATOR INTO THE OBJECT'S MAJOR FILE(S) |
| 2. ENABLE THE OBJECT BY UNSCRAMBLING AND/OR DECRYPTING PSEUDO FILENAMES TO THE REAL FILENAMES USING THE TABLE PROVIDED BY THE OBJECT ORIGINATOR. |
| 3. RECALCULATE THE OBJECT'S CHECKSUM USING THE CHECKSUM LOCATION PROVIDED BY THE ORIGINATOR. (OPTIONAL FEATURE). |
| 4. MODIFY THE RECEIPT AND ACCEPTANCE PROGRAM ITSELF BY DELETING THE CODE THAT PROVIDES FOR MODIFICATION OF THE OBJECT'S FILE(S). |
| 5. ACTIVATE THE OBJECT FOR USE OR DISPLAY BY TRANSFERRING CONTROL TO THE OBJECT MODULE/FILE NAME PROVIDED BY THE OBJECT ORIGINATOR. |

FIG. 3A

1A START-OF-PLA-PROCEDURE:

THE END USER INSERTS DISKETTE #1 OF X (OR DOWNLOADS THE PRODUCT TO THE HARD DISK), SELECTS THE CORRECT DRIVE, AND TYPES "GOXXX" (RETURN) AT THE SYSTEM PROMPT.

"GOXXX" INVOKES CO. COM, THE ENABLING PROGRAM

1B

DISPLAY FIRST LICENSE AND/OR WARRANTY MENU SCREEN TO THE USER. IT CONTAINS INTRODUCTORY INFORMATION AND DESCRIBES HOW THE TERMS AND CONDITIONS WILL BE PRESENTED TO THE USER.

CUSTOMIZED TEXT

THE USER PRESSES THE ENTER KEY TO CONTINUE TO THE SECOND MENU SCREEN.

2A MENU-SELECTION-ROUTINE:

FROM THIS MENU SCREEN, THE USER CAN SELECT TO (1) READ THE WARRANTY INFORMATION PRIOR TO ACCEPTING THE T'S AND C'S OR THE LICENSE AGREEMENT, (2) READ THE LICENSE AGREEMENT OR (3) ABORT AND RETURN TO THE OPERATING SYSTEM.

IF CHOICE = 1, THEN PERFORM WARRANTY-ROUTINE (BOX 8).
IF CHOICE = 2, THEN CONTINUE TO NEXT BOX.
IF CHOICE = 3, THEN ABORT AND RETURN TO THE OPERATING SYSTEM.

THE LICENSE AGREEMENT SCREEN(S) ARE DISPLAYED TO THE USER.

CUSTOMIZED TEXT

FOR MULTIPLE-SCREEN AGREEMENTS, THE USER PRESSES THE ENTER KEY TO GO FROM SCREEN TO SCREEN UNTIL THE LAST SCREEN. THE USER CAN ALSO PAGE FORWARD AND BACKWARD WITHIN THE AGREEMENT SCREENS.

ON THE LAST SCREEN OF THE AGREEMENT, THE USER IS ASKED TO INDICATE HIS/HER ACCEPTANCE OF THE T'S AND C'S OF THE LICENSE AGREEMENT.

IN "N" IS INDICATED, THEN ABORT AND RETURN TO THE OPERATING SYSTEM. IF "Y" IS INDICATED, THEN CONTINUE TO BOX 3
ELSE
   REQUEST CORRECT RESPONSE AND DO NOT PROCEED UNTIL CORRECT RESPONSE IS ENTERED.

3 ACCEPT-PLA-ROUTINE:

THE CHARACTER STRING IN THE OBJECT'S MAJOR FILE(S) IS MODIFIED IF THE LICENSE AGREEMENT HAS BEEN ACCEPTED. IF THERE IS A PLA.TAB FILE ON THE DISK/DISKETTE, THEN
   READ PLA. TAB INTO MEMORY
   POSITION TO THE FIRST ROW IN THE TABLE CONTINUE TO BOX 4.
ELSE
   PERFORM CHARACTER-STRING-ROUTINE (BOX 9)
   GOTO CHECKSUM-ROUTINE (BOX 6).

7
ERASE THE WARRANTY SCREEN(S) FROM
  MEMORY AND FROM THE DISK/DISKETTE.
MODIFY GO.COM BY ERASING THE CODE
  THAT ALLOWS MODIFICATION OF THE
  PROGRAM MODULES/FILES.
RENAME THE MODIFIED (SMALLER)
  GO.COM TO PLA. COM IN
  MEMORY AND ON THE DISK/
  DISKETTE.
GOTO END-OF-PLA-PROCEDURE (BOX 11).

8 WARRANTY-ROUTINE:

THE OBJECT'S WARRANTY SCREEN(S) ARE
DISPLAYED TO THE USER.

CUSTOMIZED TEXT

FOR MULTIPLE-SCREEN WARRANTIES, THE
USER PRESSES THE ENTER KEY TO GO
FROM SCREEN TO SCREEN UNTIL THE LAST
SCREEN. THE USER CAN ALSO PAGE
FORWARD AND BACKWARD WITHIN THE
WARRANTY SCREENS.

AFTER READING THE LAST SCREEN, THE
USER IS INSTRUCTED TO PRESS THE
ENTER KEY TO RETURN TO THE WARRANTY
AND LICENSE MENU SCREEN (#2 OF 2) SO
THAT HE/SHE CAN THEN SELECT TO READ
THE LICENSE AGREEMENT.

RETURN TO MENU-SELECTION-ROUTINE
(BOX 2).

SELF-VERIFYING RECEIPT AND ACCEPTANCE SYSTEM FOR ELECTRONICALLY DELIVERED DATA OBJECTS

BACKGROUND OF THE INVENTION

Field of the Invention

This invention relates to receipt and acceptance verification techniques for documents, license agreements, contracts, or computer programs generally; more specifically, it relates to techniques for verifying receipt and acceptance of electronically transmitted and/or magnetically recorded data objects.

While a variety of prior art techniques exist for protecting electronically transmitted and/or magnetically-recorded data objects, all of these that are presently known require either encryption and the use of a decrypting key or algorithm which is normally only available to a previously authorized recipient, or they require prior approval for sending to the recipient. Other than by these techniques, no present system or technique is known which is self-verifying as to the fact that the recipient has actually received the data object, agreed to the authorization conditions of its receipt or use and installed it for reading or use.

In the field of computer program products, i.e. "software", unauthorized duplication and/or access and usage is a common problem. U.S. Pat. No. 4,757,534 shows one example of a cryptographic technique for protecting such programs. The user must have a password which will allow the encrypted program to be recovered at a prescribed and designated site that has a properly implemented and initialized decryption feature.

Similarly, U.S. Pat. No. 4,757,533 deals with a security system for a personal computer which utilizes automatic encryption and decryption for files in the personal computer.

These prior art systems, and others of similar type, require the prearranged installation of encryption or decryption features and/or "keys" such as passwords before a user or recipient can utilize an electronically-delivered or magnetically-recorded and delivered data object that has been protected by encryption or other disabling techniques. This is a significant drawback in the field of computer programing sales and use, particularly in the over the counter market or in systems which would download application programs for use at a local workstation or personal computer/system. In the latter instance, the program or data object would be electronically transmitted and received, but elaborate systems are used to preauthorize the recipient by giving passwords or the like which must be carefully recorded and kept track of for accounting purposes and for billing.

OBJECTS OF THE INVENTION

In light of the foregoing known shortcomings with the prior art systems and techniques for electronic distribution of data objects, an objective of the present invention is to provide an improved method of securing electronic data objects and for verifying that they have been received and accepted which does not require prior authorization for receipt or the installation of previously authorized and released keys, passwords or the like.

It is a further object of this invention to provide a self-verifying method of delivery for electronically recorded or transmitted data objects.

SUMMARY

The foregoing and still other objects that are not specifically enumerated, are met in the present invention by a new system. In this system, the sender or originator of an electronic data object can later verify that the data object was actually received and accepted. In this system the data object itself controls the verification for the receipt and acceptance thereof. The sender or originator of the data object first modifies the object to be delivered, rendering it unusable or inoperative (non-executable) in the form in which it will be initially received by the user. The originator or sender inserts into the data object a verification indicia and an enabling facility which is capable of rendering the inoperative (non-executable) data object into an operative (executable) state when certain pre-requisite conditions, contained in the verification and enabling facility, are met. The sender or originator then merely transmits (or records and delivers) the modified and unusable (non-executable) data object that contains the verification indicia and enabling facility to a recipient. The recipient or user receives the modified and unusable data object and inserts or loads it into his/her workstation or computer having a CRT screen display, printer or the like. This allows the user to view portions of the enabling facility contained in the data object. Screen displays or messages prompting the user to enter responses are presented during this phase of installation of the data object. The user enters his or her acceptance or rejection of terms and conditions relating to the use and installation of the data object in response to prompts that are presented by the enabling facility on the screen, printer or other interface that is humanly readable. That portion of the data object that contains the enabling facility then examines the user's responses and, if the prerequisite conditions are met and agreed to, renders the data object into a usable and operable (executable) form (including a modification of the verification indicia) and records the result and may also capture the user's identification information. Alternatively, if the prerequisite conditions are not met or agreed to, it terminates without rendering the data object into a usable and operable form. This ends the process.

BRIEF DESCRIPTION OF DRAWINGS

The invention will be described with respect to a preferred embodiment in which.

DESCRIPTION OF PREFERRED EMBODIMENT

The invention will be described with reference to the several figures of the drawing in the exemplary context of a system for delivering computer programs (software products) having license terms and conditions that must be agreed to prior to the user's being granted use of his or her copy of the software product. Numerous other examples are possible, any of which relate generally to the problem of verifying that a recipient has actually received a data object and has agreed to certain terms and conditions concerned therewith. Other examples may be documents that normally require registered and signed receipt mail delivery, contracts or other documents having legal significance, itemized buying and selling arrangements, bills of lading, or any environment in which a traceable record (within the data object itself) of actual receipt and acceptance of the data object is required.

In the preferred embodiment of the invention described, an example chosen from the field of data processing is given. In this example, the "data object" may be a computer program (software product) intended for use on a workstation or personal computer/system. In such an environment, the normal users wish to obtain their copy of the relevant software product, carry it home (or to their workstations) and use it. Normally, these software products are accompanied by a "shrink wrapped" license agreement which details the terms and conditions of use which the buyer, or more appropriately, the "licensee" is deemed to be bound by virtue of his or her opening and use of the contents of the package. If high security over unauthorized duplication or usage of programs is desired in such an environment, detailed record keeping via serialization of the software product, signed receipts obtained at the time of purchase or license, detailed record keeping and auditing procedures and the like are often necessary. These are expensive and time consuming.

It would be far more desirable in today's electronic communication environment to provide software products at a central access point which could be accessed on request, and whose contents could be made available to or even downloaded for users on request. Since the users may come and go and since access to the central facility may be difficult or cumbersome to regulate, it would be more desirable still if any potential user could merely "dial up" the central facility and request access to and delivery of any given software product. This would mean that prior authorization procedures, i.e. delivery of decryption or security keys or codes or routines would not be ordinarily possible or even desirable. Additionally, in order to overcome the relatively high cost of creating diskettes or cassettes of recorded software products for delivery, the electronic distribution and duplication method holds high market appeal but offers as well the opportunity for more prevalent abuse through unauthorized access, copying, and/or use.

Into this environment, the present invention fits nicely as a solution to the problem; this invention may be implemented within the electronic data object itself and which is self-executing upon its receipt and acceptance by a user or requester.

The preferred embodiment will thus be described in the context of a system for delivery via electronic means of computer programs (software products) which provide automatic verification that the requester or recipient has actually received the software product and has agreed to the terms and conditions regarding its use.

The present invention provides a technique for the protection of electronically-distributed software products which are to be licensed to requesting end users who have not previously been authorized or provided with any specialized access keys or decryption programs or devices. The technique itself is based upon the premise that both the usability and installability of electronically-delivered software products may be conditioned upon the end user's receipt and acceptance of the terms and conditions regarding the specific software product. A license agreement of the readable form normally enclosed with recorded diskettes or cassettes is incorporated into the electronically-delivered data object or software product and is delivered therewith. The invention presents to the user the terms and conditions regarding the use, charges for and other relevant data pertaining to the software product for the user's review and acceptance or rejection. The invention presents prompts or questions to the user and records the responses as evidence that a user did receive, and has or has not agreed, to the terms and conditions regarding the software product. If the user does agree to the terms and conditions and so indicates, the invention provides for "enabling" the delivered disabled and unusable, i.e. not executable, software product. It also provides for marking that user's copy with indicia which indicates acceptance and may also determine the identity of the user. The invention thus provides the electronic equivalent of "breaking of the shrink wrap seal" involved in the normal hard copy of software license agreements delivered with physical diskettes or cassettes. It replaces prior authorizations via signed agreements which are prearranged in electronic distribution systems which require that potential users first sign up and agree to the license agreement terms and conditions in order to receive a decryption key or password which will grant them access to the desired software products.

Figures 1, 1A:
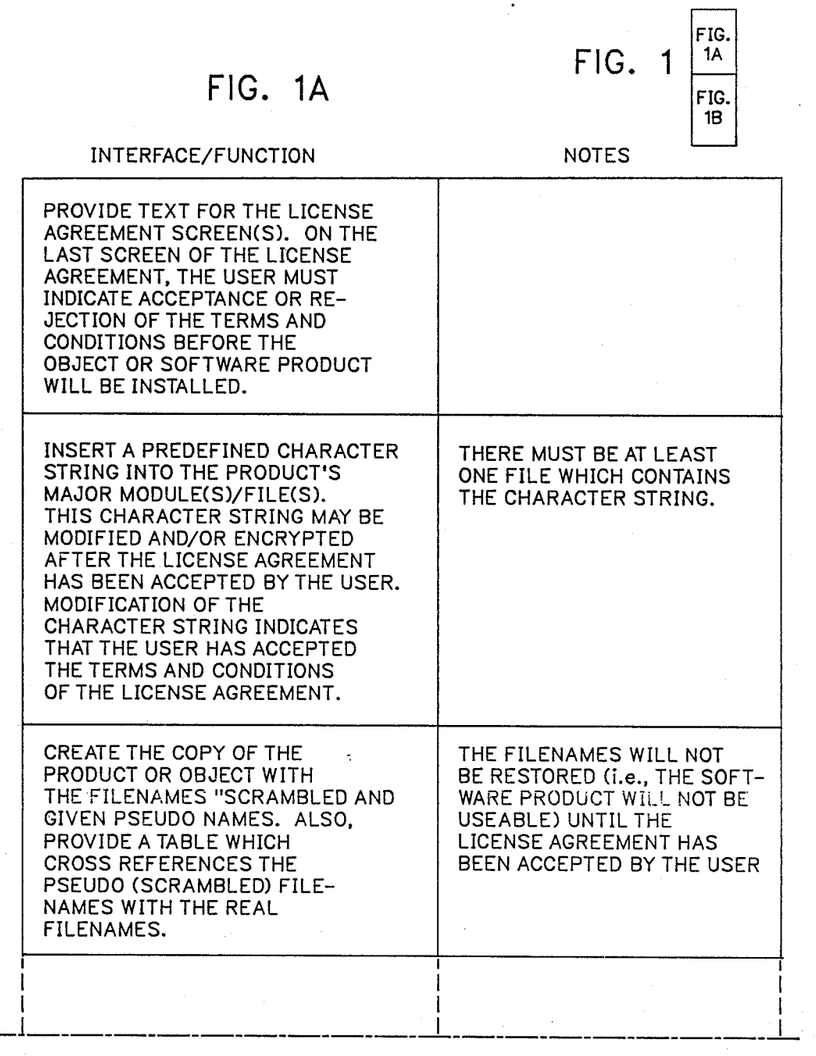
FIG. 1 is a brief flow chart of steps taken by the data object originator or sender prior to sending or delivering the data object to a user.
Figure 1B:
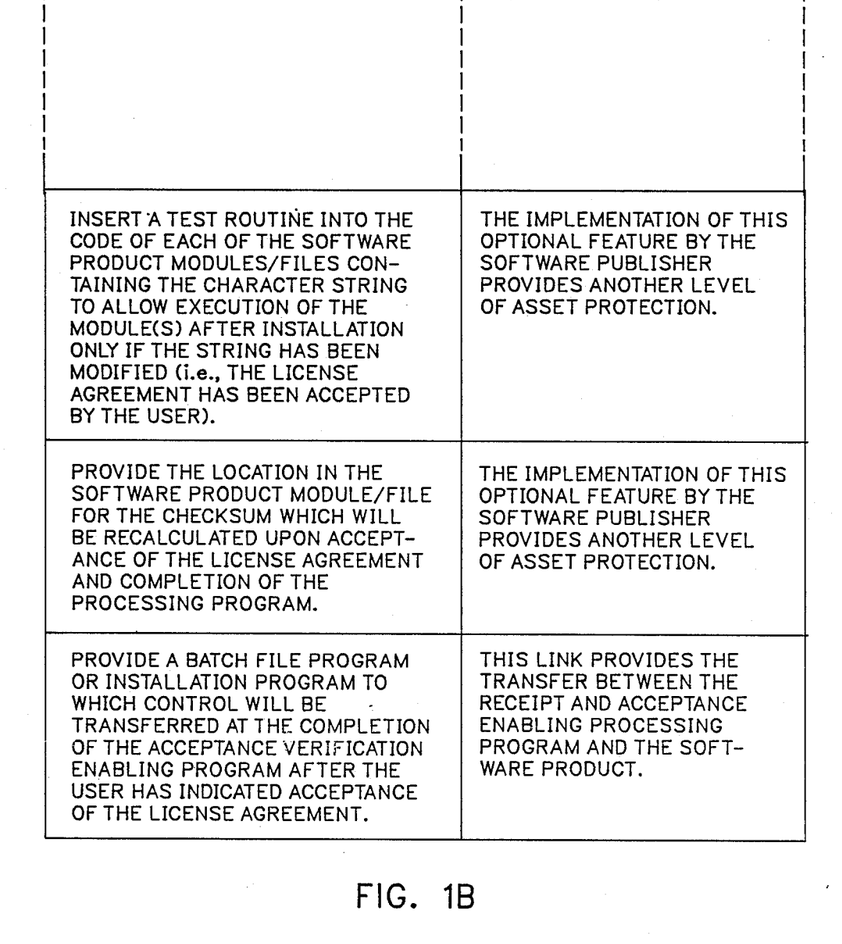

The invention requires some preparation on the part of the software product originator or sender. As shown in FIG. 1, the software product originator is required to include with the software product, or electronically-deliverable data object, modules of code that provide a presentation and acceptance verification and enabling facility (enabling program). The software product originator is further required to provide certain input to the enabling program. The originator must provide the language of the pertinent terms and conditions of the license agreement by recording them as screen or output display code that will be accessed automatically by the enabling program. An appropriate prompt as to acceptance or rejection of the terms and conditions of the license agreement may also be provided in this data by the originator. In addition, the originator must insert an arbitrary predefined character string of the originator's own choosing into the software product's major module(s) or file(s). This aribitrary character string which may be called a "verification indicia" may be recognized by the software product itself as will be described later. It also will be modified and/or encrypted after the license agreement has been read and accepted by the user to indicate that the user has accepted the terms and conditions of the license agreement as will be later described.

It is also incumbent upon the originator of the software product to create a copy of the software product with the pertinent file names or module names given "pseudo names" which are scrambled and to provide a table with cross references showing the correspondence between the pseudo or scrambled file names and the actual file names of the software product. These actual file names will not be restored and the software product itself will not be a usable (executable) program. The enabling program will restore the actual file names and unscramble the contents in response to acceptance by the user of the terms and conditions accompanying the software product.

The originator of the software product must as noted earlier, provide a copy of the unscrambling and enabling facility. This is a short program routine as will be illustrated later. Finally, the originator should provide a batch file or installation routine to which control may be transferred at the completion of the acceptance and verification process after the user has indicated his or her acceptance of the terms and conditions regarding use of the software product.

Before proceeding to a detailed description of the overall operation that occurs for enabling the software product for use at the user's computer or workstation, the basic concepts are summarized as follows:

The programs, which are the preferred embodiment of this invention, are incorporated into and become an integral part of the software product to be actually delivered. This portion of the invention actually presents the applicable terms and conditions of a license agreement to the end user by displaying license agreement screens as the initial step during the installation process of the software product on the user's system. If the end user does not indicate acceptance of the terms and conditions of the applicable license agreement, the enabling program portion of the invention will abort operation, make no modifications to render the associated software product usable (executable) and will return control to the user's operating system. In effect, "no harm" has been done and the end user can follow whatever procedures are desired for returning the effectively "unopened" software product or can destroy it as applicable. If, however, the user does indicate acceptance of the terms and conditions of the applicable license agreement, the portion of the preferred embodiment code will take additional actions. It will electronically record the user's acceptance by modifying certain predefined fields within the software product's applicable module(s) and file(s). It will also restore the original file names thereof, to allow them to be usable (non-executable) again, thus rendering the formerly unusable program into a usable (executable) state. And it will modify itself, finally, by deleting the code portions which allowed unscrambling or decryption and reconstruction of the delivered software product and will hand control over to the installation module or startup routine of the software product.

The primary advantage of this new system of security and delivery is that it essentially makes electronically distributed programs "Self protecting". It facilitates easy customization of license provisions and/or warranty information and provides a wide range of asset protection mechanisms usable at the discretion of the software product originator. Those skilled in the art will realize that, within the scope of this invention, it is possible to redefine the "intellectual property" asset, i.e. the software product, to which the license agreement and to which the protection technique are applicable, as a single software product or a set of software products including their associated documentation which may be electronically delivered to the user as a unit or package. The contents of the package or unit are to be determined by the software originator or distributor.

The essential elements of the preferred embodiment in programming are provided by the software originator as will be described in greater detail with reference to FIGS. 2 and 3.

Figure 2:
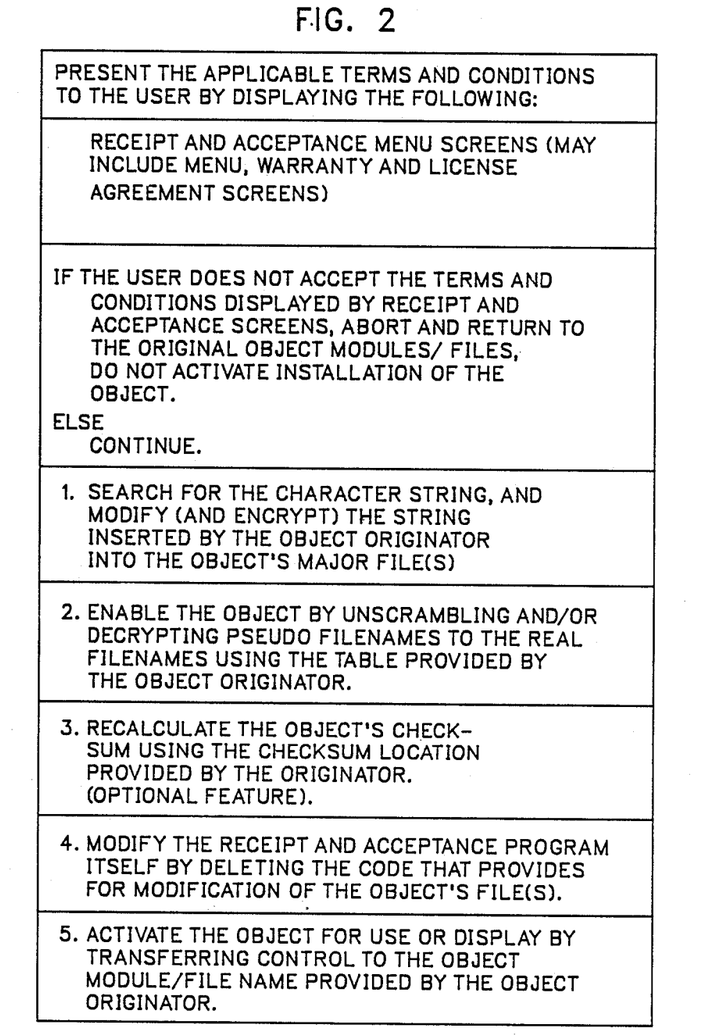
FIG. 2 is a brief flow chart illustrating the operation of the invention at the recipient or user's workstation or computer.
Figures 3, 3E:
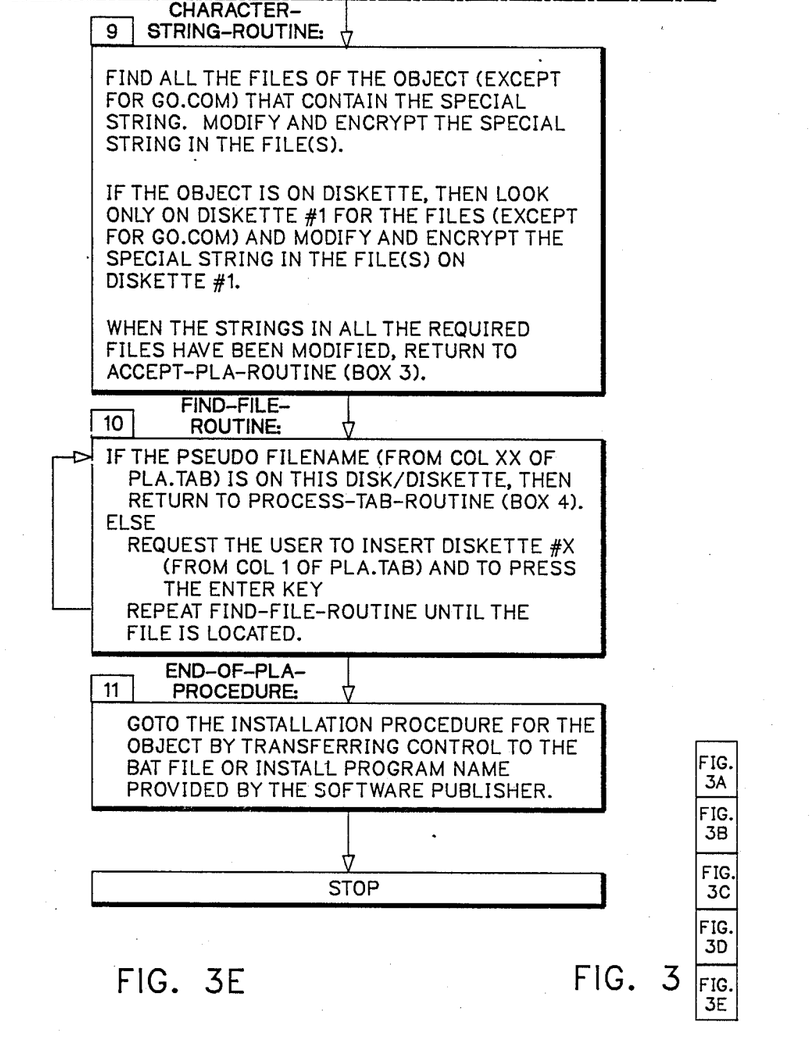
FIG. 3 illustrates a detailed processing flow chart of the operation of the invention at the recipient or user's workstation or computer.
Figure 3A:
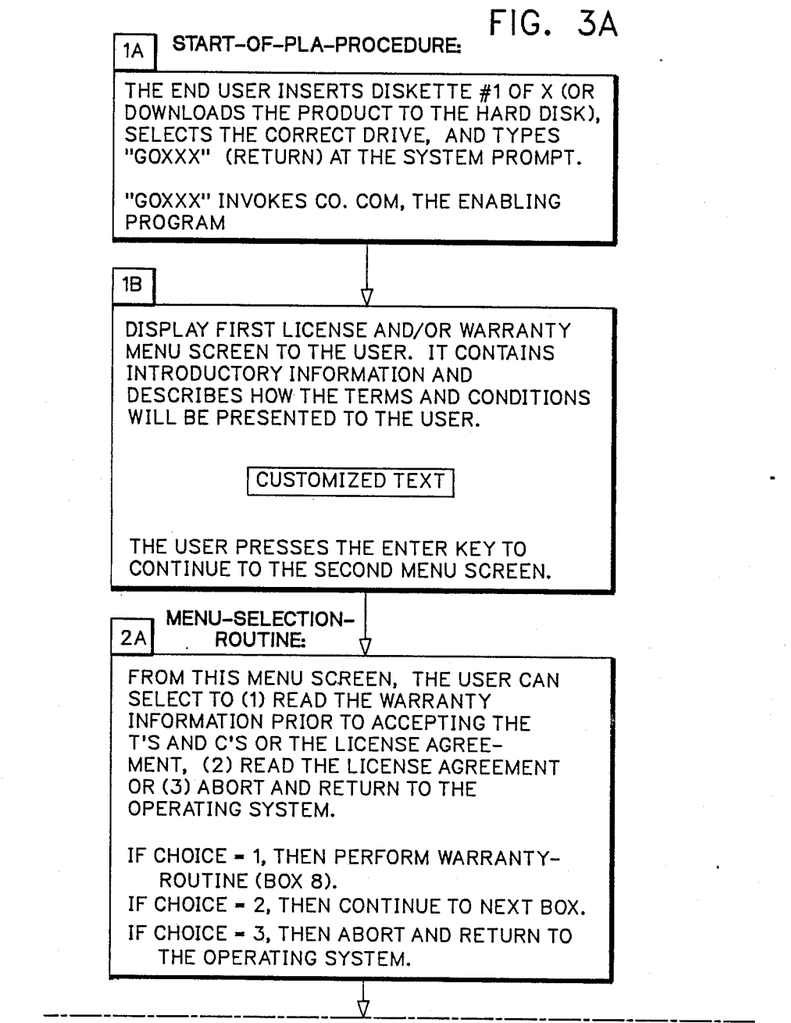
Figure 3B:
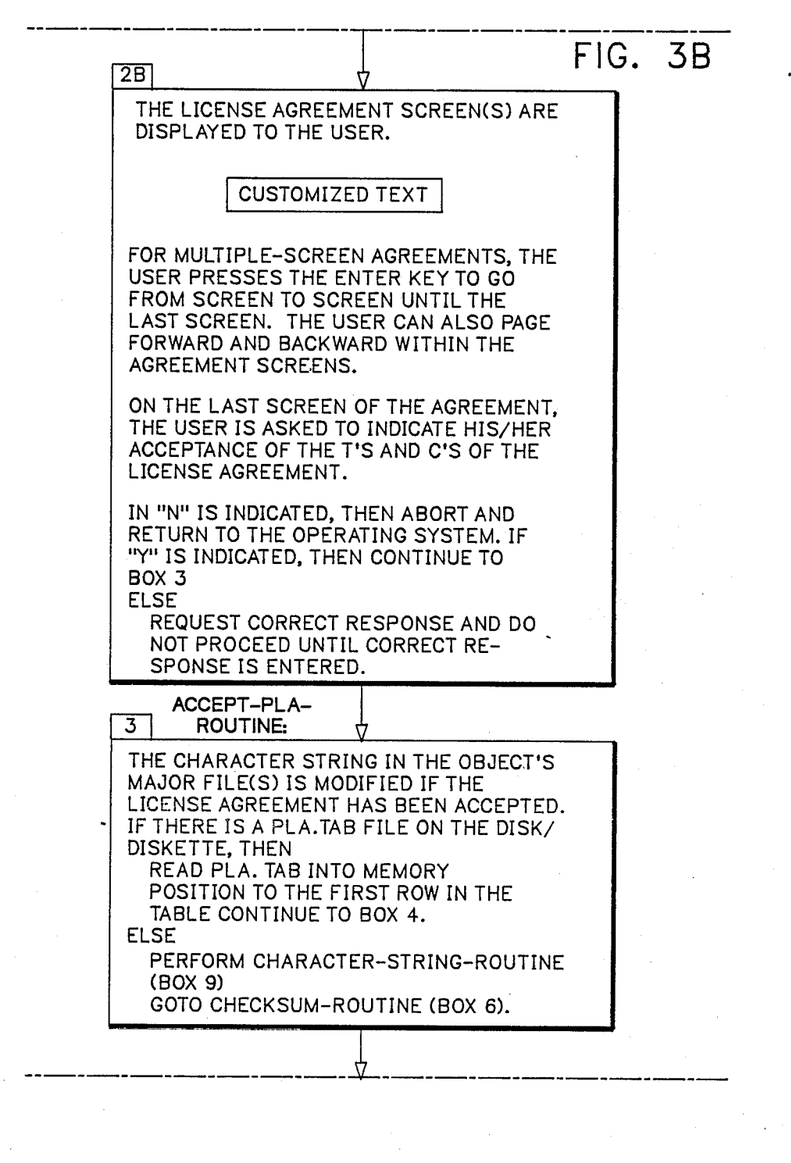
Figure 3C:
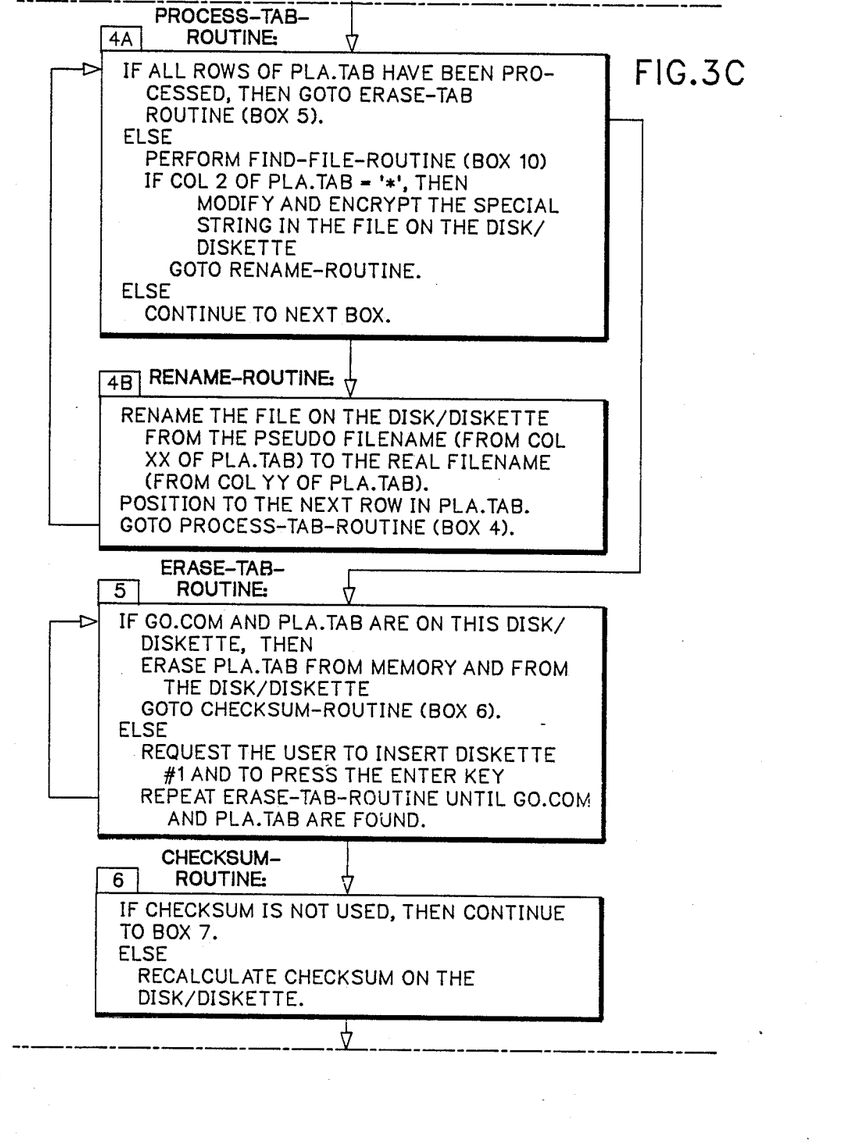
Figure 3D:
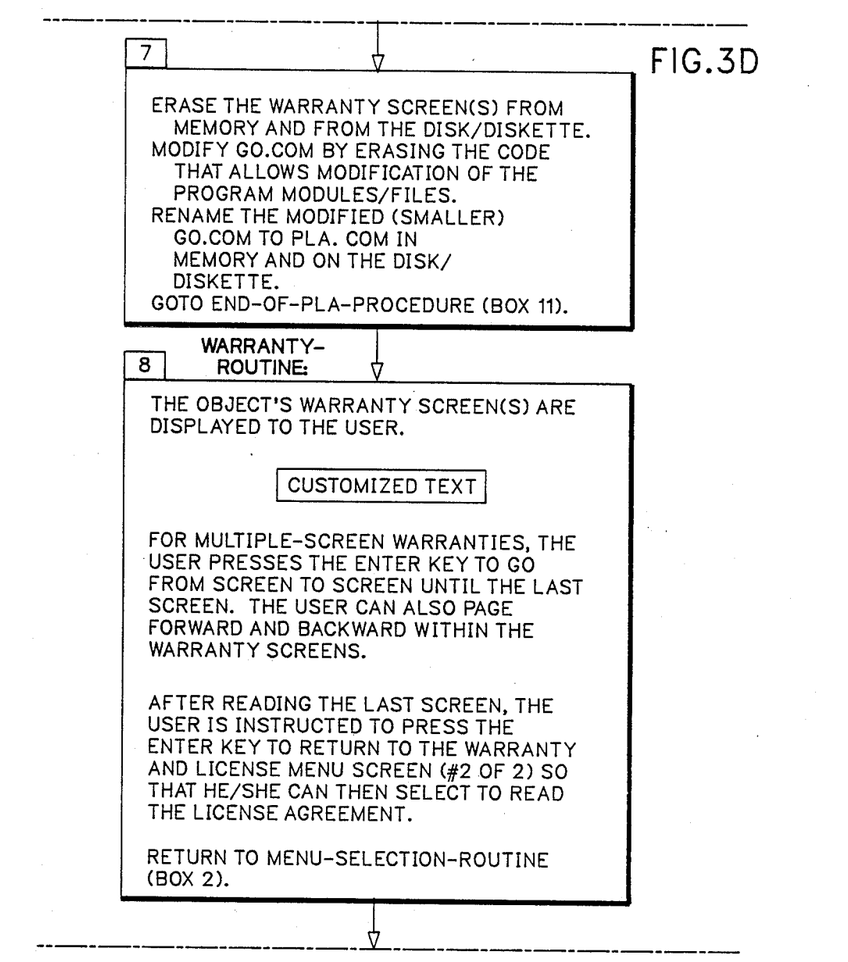
Figure 4:
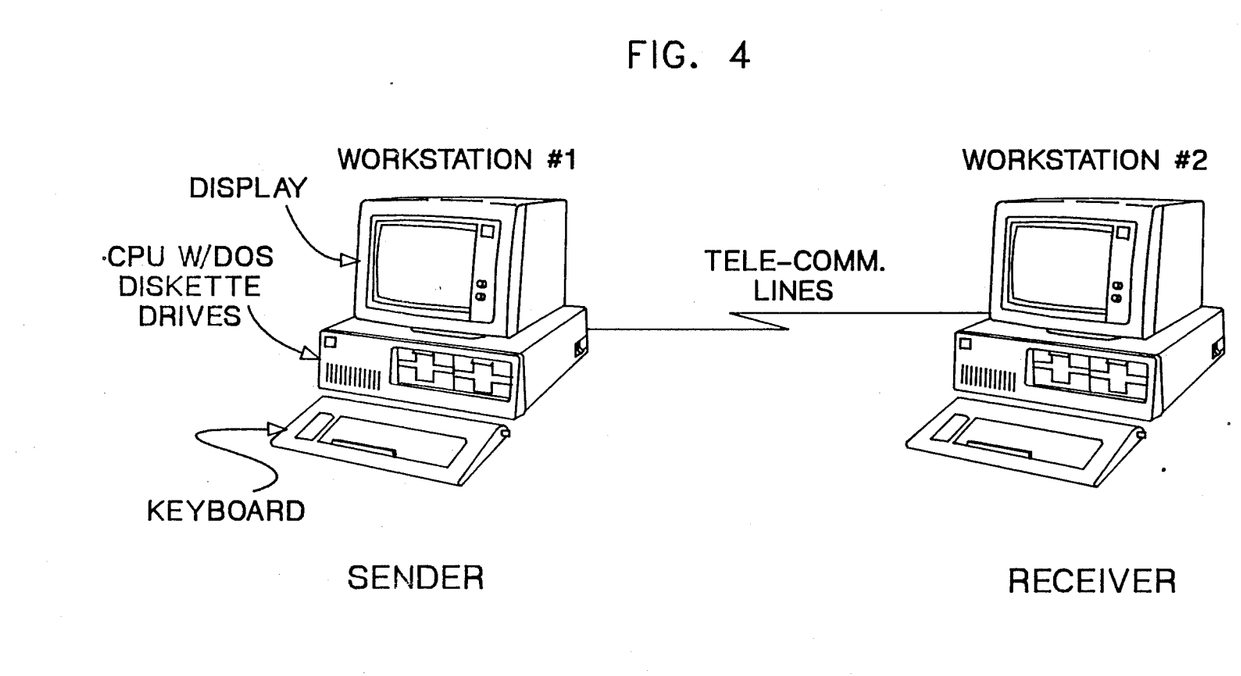
FIG. 4 illustrates a computer system implementation of workstations linked together by a telecommunications line for exchange of programs, files or data as a system embodiment of the invention.

Turning to FIG. 2, a brief flow chart is shown of the operation that will be conducted by the preferred embodiment contained within the delivered data object when it is initialized and run on the recipient's computer or workstation.

The first step as shown in FIG. 2 is for the system to access the files which contain the display data for displaying the receipt and acceptance menu screens for the user's review. These will include a menu, license agreement terms and conditions and/or warranty terms and conditions and the like.

The second step as shown in FIG. 2 is to present choices to the user to accept or decline the terms and conditions which are displayed on the receipt and acceptance information screens. If non-acceptance is indicated by the user, the program aborts and returns to the operating system without altering the original object modules and files to render them into a usable state. However, if the user does indicate acceptance of the terms and conditions, the program continues as shown in blocks 1–5 as follows.

In block 1, the program for enabling the object for use will search for the previously mentioned arbitrary character strings embedded in the original object file(s) by the originator thereof. These will then be modified, and, optionally, encrypted if so desired, to contain information entered in response to prompts by the user or recipient that may also identify the specific user.

Then the program will enable the electronically-delivered object by unscrambling (or decrypting) the scrambled pseudo file names by replacing them with the real file names. This is done using the table of correspondence that has been previously provided in the data object by the originator. This table cannot even be accessed or utilized by the enabling program unless the acceptance of the terms and conditions has been indicated by the user.

As shown in block 3, the program may optionally recalculate the check sum of the object being delivered, if a check sum is employed.

As shown in block 4, the program for enabling then must modify itself to delete that portion of the code that provided for the enabling of the delivered object. It also will delete the correspondence table and finally, in block 5, transfer control to the object's initial startup module or file at the name indicated by the software originator. This activates the delivered object for use and operation.

The detailed operation will now be described with reference to FIG. 3 which shows the processing or enabling program flow chart at the recipient or user's computer or workstation upon loading the received electronically-transmitted and/or magnetically-recorded data object (software product). The end user will insert, as shown in box 1, his/her diskette if the software product has been magnetically recorded and delivered or will request a download of the electronically-distributed software product from a host system to the hard or floppy disk drive of his/her computer or workstation. The user will then invoke the initialization and enabling facility embedded in the software product by the originator by entering the command "goXXX"

as shown in box 1. This command invokes the enabling program. In box 1, the XXX portion is a unique identifier that identifies the name of the software product to be utilized. The enabling program is named "go.COM" but will be renamed "PLA.COM" once the license agreement has been accepted by the user and the software product files have been unscrambled and renamed.

The enabling program then displays the first originator's prescribed license and/or warranty menu display screen to the user. This screen would normally contain introductory information and describe how the terms and conditions will be presented to the user on following screens. The user would normally press the enter key to continue to the second or succeeding menu screens. The program then continues to box 2 to present a menu screen of user choices as shown. If the user chooses to read prescribed warranties (choice 1), the program exits box 2 and accesses warranty display screens (box 8) which, after being reviewed, return the user to his block. If choice 2 is chosen, the license agreement screens will be displayed to the user and the system will continue as shown. If choice 3 is selected, then the system aborts without enabling the software product for use and returns to the operating system. If any other key is pressed, a message will be displayed and a correct choice will be prompted from the user.

If the license agreement screens are selected (choice 2), they are displayed to the user utilizing whatever text for the license agreement the originator has encoded into the software product. The user is prompted to indicate acceptance or rejection of the terms and conditions of the license agreement on the last screen thereof. If rejection is indicated, the system aborts and returns to the operating system without enabling the software product for use.

If acceptance is indicated, the system continues on to box 3 by commencing the "accept PLA" program routine. The first step in box 3 is to search for the correspondence table that shows the correspondence between the pseudo (scrambled) file names and the actual software product file names. If there isn't such a table, the program then searches for the arbitrary character string embedded in major file(s) or module(s) by the product originator and modifies them as will be later discussed on box 9. Secondly, if there is a correspondence table, the program reads the table into memory and accesses the first row in the table to provide a correct file name for the module identified therein instead of its pseudo or scrambled name. The next step is to modify and/or encrypt the arbitrary character string if it is embedded in the major file or module being accessed. This process continues until all of the entries in the table have been exhausted, all of the arbitrary character strings have been modified, and all of the corresponding files or modules have been renamed to their correct names. An optional alternative following the completion of the above tasks is to recalculate a check sum (if that is used) as shown later in box 6.

If there is a correspondence table, the program continues to box 4 where the table processing routine checks to see if all of the rows of the scrambled name table have been processed. When the rows have all been processed, the table is erased as shown in box 5. Box 4 provides the ability for the program originator to require modification and encryption of the character string in the files of the delivered data object.

The "erase table" routine is shown in box 5 and is entered from box 4 when all of the table entries have been processed. The enabling program then continues to box 6, which may optionally recalculate the check sum if provided with the software product, the enabling program continues to box 7 to erase the warranty screen from memory and from the electronically-delivered software product. The enabling program then modifies itself by erasing the code that allows the modification of the character strings and the file names, i.e. the unscrambling and renaming, and renames itself "PLA.COM" so that the license agreement screens can be recalled if desired; it then transfers control to box 11.

Box 8 shows the optional warranty routine portion of the enabling program which is entered from box 2.

Box 9 which is entered from box 3, is the character string routine that searches for all files in the electronically-delivered software product that contain the character string placed there by the originator. It modifies (and/or encrypts) the string within these files and, when all of the accessed character strings have been found and modified, this portion returns to the acceptance routine in box 3 above. Another purpose of this box 9 is to provide a further level of security on use of the product. If the files which contain the arbitrary character string do not contain the modified form which should have resulted from this box operation, then the software originator has an easy means for implementing an abort for disabling use of the code by simply including a test routine to test each file when it is accessed for the correct character string. Testing for this use of these character strings by the software product itself is thus optional.

Box 10 is invoked from box 4 in the flow chart and is the file finding portion of the enabling routine. If the software originator has scrambled the original product file names, the files will not be usable until the license agreement has been accepted by the user and the files have been unscrambled. The publisher or originator has originally provided a table of cross-references between the pseudo file names and the actual file names. The routine ends in box 4 which is entered from box 3 as noted previously.

The enabling program ends finally in box 11 which is entered from box 7 as noted previously. By handing control over to the batch file or installation program name provided by the software originator, the enabling program will then proceed to initialize the actual software product for use.

It will be appreciated in the foregoing that the renaming or scrambling of the original files is first accomplished by the software originator and that the originator also provides, together with the scrambled file, the table of corresponding pseudo names or scrambled names with their corresponding actual file names. By this means the correct file names may be restored by the enabling portion of the routine if it, in turn, is enabled by the user's acceptance of the license agreement terms and conditions. A "self-enabling" facility is thus built into the software product by the originator. This facility is invoked, albeit somewhat unknowingly by the end user. In effect, the software product is rendered unusable, since internal references within code modules to use files or file names will not find the corresponding files or file names unless the unscrambling process has been carried out previously. The unscrambling process, in turn, will not be entered and cannot be invoked unless the user has indicated acceptance of the terms and conditions of the license agreement. The electronic data object as delivered, i.e. the software product as provided by the originator, thus contains not only the software product program code but the enabling routine together with the necessary enabling table and an appropriate set of screens and a small amount of control code to determine whether the user has indicated acceptance or rejection of the license agreement screen information. If acceptance is indicated and the enabling routine is allowed to proceed to completion, the routine then erases the enabling portions of itself and the enabling table. It thus effectively destroys the "keys" or "decryption technique" prior to granting access or actual use of the software product to the user. Also, the enabling program routine as described in the figures includes a step that encrypts or otherwise records information entered by the prospective user so that it permanently "marks" the user's copy with information that could be later accessed by the program originator. This information may uniquely identify the user and his/her copy of the software product so that any unauthorized copies that are later detected may be traced back to their origin. It will thus be seen that a variety of security provisions, some of which are optional (i.e., the checksum calculation and testing within the software product itself for the modified character strings), may be easily included at the selection of the program originator while no special provision need be made or taken at the user's end to provide access to the delivered software product other than indication of acceptance of the terms and conditions which will invoke the enabling routine and restore the software product to a usable form.

Extension of these concepts to a variety of other fields is clearly within the scope of this invention. For example, the electronically delivered data object need not be a program with license agreement screens but could be simply a certified message or legal document, receipt of which is desired in a verified manner. A verification statement and acceptance screen, acceptance of which will be indicated by the user, can be utilized to access an acknowledgement transmission back to the sender that will occur if and only if the recipient agrees to receive the message. By a similar obvious extension, the content might not be either a license agreement or a message but could be a contract, a bill of lading, or any other document of legal significance certified receipt and acceptance of which is desired.

Having thus described our invention with respect to a preferred embodiment as implemented in simple program routines, it will be obvious to those of skill in the art that many modifications and enhancements are possible without departing from the basic concepts of the self-enabling, self-verifying process of the routine as described in the preferred embodiment. Therefore, what is intended to be protected by way of letters patent is set forth in the following claims as description and not limitation.

What is claimed is:

1. In an information communication system, said system including a sender for data objects and a receiver for data objects, said sender and receiver being physically separated from one another, and including means at said sender for preparing data objects for delivery to said receiver and data delivery means for delivering said data objects from said sender to said receiver, a self-enabling subsystem for verifying receipt and acceptance of delivered data objects, comprising:

means at said sender for modifying said data objects for delivery, said modifying rendering said objects into a non-executable state;

means at said sender for inserting an enabling means into said data object prior to delivery thereof; and means at said receiver for loading said modified data object into a computer for display and for operations thereon; and means for initially accessing only said enabling means in said data object and for displaying portions of data contained therein in humanly readable form for soliciting a user's response thereto; and means for entering a user's response and means for recording said user's response; and means for examining said user's response and means conditioned by said examination of said user's-response for employing said enabling means and modifying said data object back to an executable state.

2. A system as described in claim 1, further comprising:

means at said sender for inserting a verification indicia into said data object; and means at said receiver for modifying said verification indicia in response to said user's response.

3. A system as described in claim 1 or claim 2, wherein:

said receiver includes means responsive to said enabling means and to said user's response for erasing said enabling means.

4. A system as described in claim 1 or claim 2, wherein:

said means for modifying comprises means for replacing original component names in said data object with other names not used by said data object; and recordkeeping means for recording the correspondence between replacement component names and original component names and for inserting said record thereof into said data object.

5. A system as described in claim 2, wherein:

Said means for modifying said verification indicia modifies said indicia in a manner which shows that said enabling means has been employed to remodify said data object.

6. A system as described in claim 1 or claim 2 or claim 5, wherein: said enabling means erases portions of itself from said data object.

7. In a system for delivering data objects from a sender to a receiver, the method of verifying receipt and acceptance of said data objects, comprising steps of:

modifying said data object into a non-executable form; inserting an enabling means into said data object;

delivering said data object to said receiver in said non-executable form; and employing only said enabling means in said data object at a user's direction to remodify said data object back to a usable form said remodification indicating receipt of and acceptance of said data object by a said user.

8. The method of claim 7 wherein:

said modifying step further comprises inserting a verification indicia into said data object; and said employing of said enabling means modifies said verification indicia.

9. The method of claim 7 or claim 8, wherein:

said modifying step further comprises substituting new names for existing file component names in said data object and recording the correspondence between said new names and said existing names as a portion of said data object at a location accessible only by said enabling means.

10. The method of claim 9, wherein: said step of employing said enabling means further comprises:
steps of accessing said recording of names correspondence and restoring said original names as file component names, erasing said record of names correspondence and said enabling means.

* * * * *